(12) United States Patent
Han et al.

(10) Patent No.: US 9,632,894 B2
(45) Date of Patent: Apr. 25, 2017

(54) APPARATUS FOR ERROR SIMULATION AND METHOD THEREOF

(71) Applicant: Electronics and Telecommunications Research Institute, Daejeon (KR)

(72) Inventors: Jin-Ho Han, Seoul (KR); Young-Su Kwon, Daejeon (KR); Kyung-Jin Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 139 days.

(21) Appl. No.: 14/677,297

(22) Filed: Apr. 2, 2015

(65) Prior Publication Data

US 2015/0293827 A1 Oct. 15, 2015

(30) Foreign Application Priority Data

Apr. 9, 2014 (KR) .......................... 10-2014-0042511

(51) Int. Cl.
*G06F 11/00* (2006.01)
*G06F 11/22* (2006.01)

(52) U.S. Cl.
CPC ................ *G06F 11/2215* (2013.01)

(58) Field of Classification Search
CPC ................................. G06F 11/2215
See application file for complete search history.

(56) References Cited

U.S. PATENT DOCUMENTS

| | | | |
|---|---|---|---|
| 4,903,270 A * | 2/1990 | Johnson | G06F 11/1608 714/703 |
| 5,696,788 A | 12/1997 | Choi et al. | |
| 6,092,217 A * | 7/2000 | Kanekawa | G05B 9/03 714/11 |
| 7,206,966 B2 | 4/2007 | Barr et al. | |
| 7,966,514 B2 | 6/2011 | Surasinghe | |
| 8,051,323 B2 | 11/2011 | Pathirane et al. | |
| 9,317,408 B2 * | 4/2016 | Szpak | G06F 11/3688 |
| 2007/0189536 A1 * | 8/2007 | Gammel | H04L 9/004 380/259 |
| 2014/0019818 A1 * | 1/2014 | Jindal | G06F 21/556 714/724 |

FOREIGN PATENT DOCUMENTS

KR 100168922 B1 2/1999

* cited by examiner

*Primary Examiner* — Joshua P Lottich
(74) *Attorney, Agent, or Firm* — William Park & Associates Ltd.

(57) ABSTRACT

The present invention relates to an apparatus for computing an error rate comprising: a first circuit interface being connected to a first sub-circuit receiving data and computing output data through a predetermined computation process; a second circuit interface and being connected to a first test circuit receiving the same data, which is inputted to the first sub-circuit, and computing output data through the predetermined computation process; an error injecting part injecting an error to the first test circuit; an error detecting part comparing output data of the first sub-circuit to output data of the first test circuit; and an error rate computing part computing input node error probability of the first sub-circuit by statistic processing of the compared result. The apparatus and method for computing error rate of the present invention is able to shorten the time required to obtain error probability, compared to the direct simulation of the full circuit.

14 Claims, 6 Drawing Sheets

P(X) : Soft error rate on input terminal x
P_P(X) : Propagated soft error rate
P(G) : Soft error rate occured at logic gate

| I | J | O | P_P(O) |
|---|---|---|---|
| 0 | 0 | 0 | P(I)*P(J) |
| 0 | 1 | 0 | P(I)*(1-P(J)) |
| 1 | 0 | 0 | (1-P(I))*P(J) |
| 1 | 1 | 1 | 1-{(1-P(I))*(1-P(J))} |

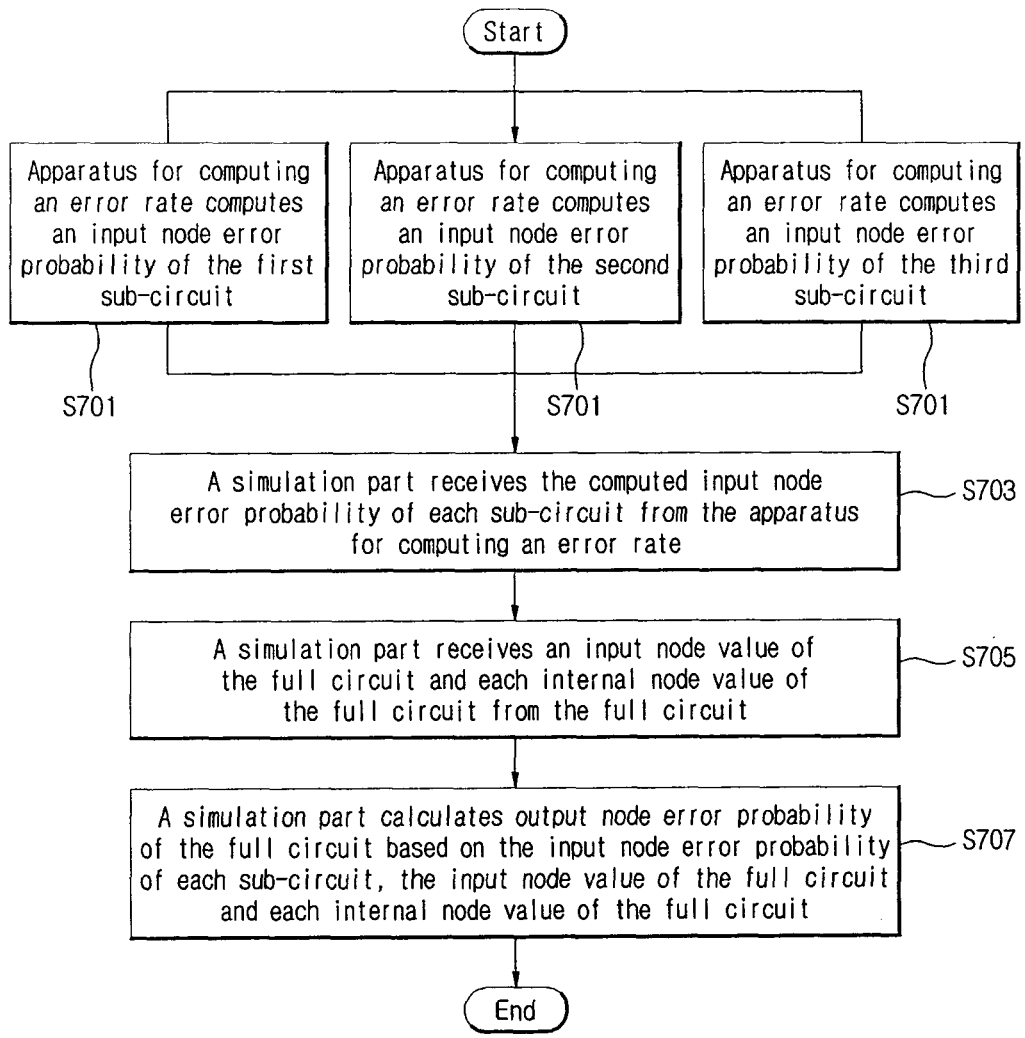

APPARATUS FOR ERROR SIMULATION AND METHOD THEREOF

CROSS REFERENCE TO RELATED APPLICATION

This application claims the benefit of Korean Patent Application No. 10-2014-0042511, filed on Apr. 9, 2014, entitled "Apparatus and method for error simulation", which is hereby incorporated by reference in its entirety into this application.

BACKGROUND OF THE INVENTION

1. Technology Field

The present invention relates to an apparatus and method for error simulation simulating by injecting an error and computing an error rate when a digital circuit is designed to have fault tolerant feature.

2. Description of the Related Art

A digital circuit may cause errors due to alpha particles, heat, low operating voltage and etc. Such errors further lead operating fails or faults of the digital circuit depending on the situation. Since such errors are fatal to the digital circuit, it requires an error preventing device to prevent them. It also requires a simulation device to test the performance of the error preventing device which is expected to reduce error occurrences when the error preventing device is applied to a system.

Unlike an analog circuit, a digital circuit implements desired functions by delivering 0 or 1. An error in a digital circuit may inverse output of an element or a cell composing the digital circuit at 0 or 1. This error occurred thereby is classified into immortal SEU and SET. SET causes errors to nodes of the digital circuit due to alpha particles, heat or, low operating voltage and the like but such errors disappear as time goes. SEU is the case where an error is maintained to a next state change by changing a sequential logic state. A simulation device to detect occurrence of errors caused by SET/SEU is required to determine and verify the performance of a part having a fault tolerant feature. In addition, the simulation device is also required for a system to which the part having a fault tolerant feature is applied.

SUMMARY OF THE INVENTION

An object of the present invention is to provide an apparatus and method for error simulation through injection of an error and determining an error probability.

Another object of the present invention is to provide an apparatus and method for error simulation determining an error probability of a full digital circuit with a static analysis.

According to an aspect of the present invention, there is provided an apparatus for computing an error rate comprising: a first circuit interface being connected to a first sub-circuit receiving data and computing output data through a predetermined computation process; a second circuit interface being connected to a first test circuit receiving the same data, which is inputted to the first sub-circuit, and computing output data through the predetermined computation process; an error injecting part injecting an error to the first test circuit through the first circuit interface; an error detecting part comparing output data of the first sub-circuit to output data of the first test circuit; and an error rate computing part computing an input node error probability of the first sub-circuit by statistic processing of the compared result.

Preferably, the apparatus for computing an error rate further comprises an error generating part generating an error by extracting node information of the first sub-circuit.

Preferably, the node information comprises information of input node and output node of the first sub-circuit.

Preferably, the error generating part generates error injection information comprising information of error occurrence time and node of the first test circuit to cause an error.

Preferably, the error injecting part injects an error to the first test circuit to correspond to the error injection information.

Preferably, the error injecting part injects an error by inverting node value of the first test circuit.

Preferably, the error detecting part detects an error when the output data of the first sub-circuit is compared to and disagrees with output data of the first test circuit.

According to another aspect of the present invention, there is provided an error simulation device comprising; an apparatus for computing an error rate; and a simulation part computing an output node error probability of the first sub-circuit based on the input node error probability of the first sub-circuit.

Preferably, the first sub-circuit comprises a plurality of input nodes and the simulation part computes an output node error probability of the first sub-circuit based on input node error probability of the first sub-circuit for the plurality of input nodes.

Preferably, the error simulation device further comprises a second sub-circuit receiving and outputting the data, comprising a node and being connected to output node of the first sub-circuit, wherein the simulation part computes an output node error probability of the second sub-circuit based on input node error probability of the first sub-circuit.

Preferably, the simulation part computes an output node error probability of the first sub-circuit based on input node error probability of the first sub-circuit, and computes output node error probability of the second sub-circuit by placing the output node error probability of the first sub-circuit as input node error probability of the second sub-circuit.

According to still another aspect of the present invention, there is provided a method for computing an error rate comprising: inputting data to a first sub-circuit and receiving output data from the first sub-circuit; inputting the same data, which is inputted to the first sub-circuit, to a first test circuit; injecting an error to the first test circuit; receiving output data from the first test circuit; comparing the output data of the first sub-circuit to the output data of the first test circuit; and computing an input node error probability of the first sub-circuit by statistic processing of the compared result.

Preferably, the method for computing an error rate further comprises generating an error by receiving node information of the first sub-circuit.

According to still another aspect of the present invention, there is provided an error simulation method comprising: inputting data to a first sub-circuit and receiving output data from the first sub-circuit; inputting the same data, which is inputted to the first sub-circuit, to a first test circuit; injecting an error to the first test circuit; receiving output data from the first test circuit; comparing the output data of the first sub-circuit to the output data of the first test circuit; and computing an input node error probability of the first sub-circuit by statistic processing of the compared result.

The present invention allows shortening an operating time by rapidly obtaining an error probability, instead of simulating a full circuit.

The present invention also allows computing an error probability easily by simulating a full circuit composed with sub-circuits only based on error probabilities for the sub-circuits.

BRIEF DESCRIPTION OF THE DRAWINGS

FIG. 7 is a flowchart illustrating an error simulation method using an error simulation device according to another embodiment of the present invention.

DESCRIPTION OF THE EXEMPLARY EMBODIMENTS

The present invention will be described in detail with reference to particular embodiments and it is to be appreciated that various changes and modifications may be made.

However, the exemplary embodiments disclosed in the present invention and the accompanying drawings do not limit the scope of the present invention. The scope of the present invention should be interpreted by the following claims and it should be interpreted that all spirits equivalent to the following claims fall within the scope of the present invention. Throughout the description of the present invention, when describing a certain technology is determined to evade the point of the present invention, the pertinent detailed description will be omitted. Throughout the description of the present invention, the same functions are rendered the same reference number in order to facilitate understanding, regardless of the figure number.

Figure 1:
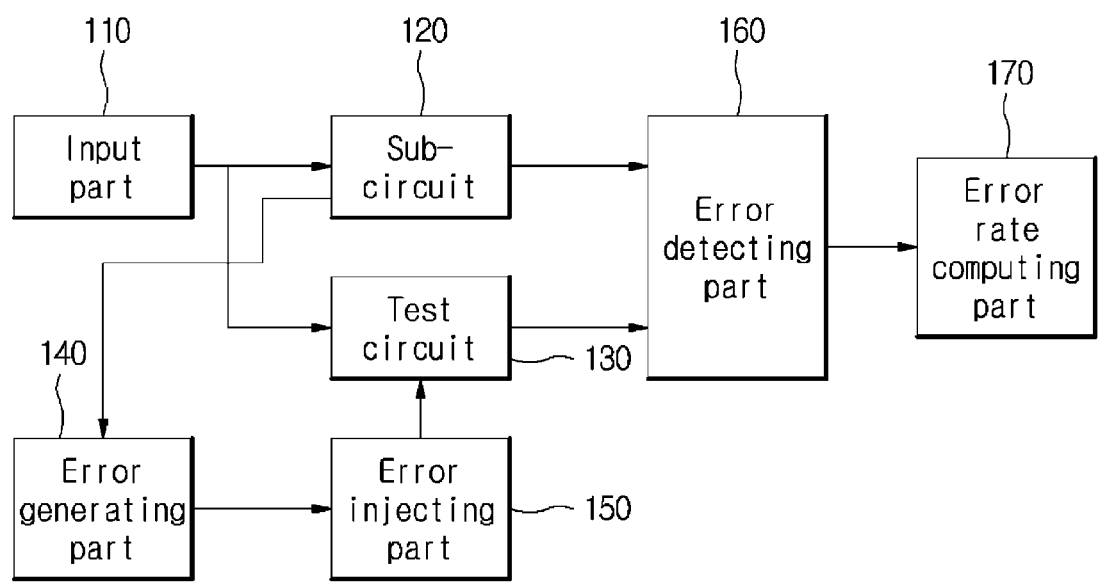
FIG. 1 illustrates a configuration view of an apparatus for computing an error rate according to an embodiment of the present invention.

FIG. 1 illustrates a configuration view of an apparatus for computing an error rate according to an embodiment of the present invention.

Referring to FIG. 1, the apparatus for computing an error rate 100 comprises an input part 110, a sub-circuit 120, a test circuit 130, an error generating part 140, an error injecting part 150, an error detecting part 160, and an error rate computing part 170.

The input part 110 receives data and transmits the data to the sub-circuit 120 and the test circuit 130. The input part 110 transmits the data to each of a plurality of sub-circuits 121, 122 and a plurality of test-circuits 131, 132 when each of the sub-circuit 120 and the test circuit 130 is more than one. The input part 110 transmits the data to the sub-circuit 120 and the test circuit 130 at the same or different time. The input part 110 transmits the same data to the sub-circuit 120 and the test circuit 130.

The data may be in a form of binary input vector. The data may be a binary-coded value arranged in series for each input node of the sub-circuit 120. When the sub-circuit 120 has a plurality of input nodes, the data may be a binary-coded value arranged in series corresponding to a number of the input nodes.

The sub-circuit 120 receives data from the input part 110, outputs output data of the sub-circuit 120 generated through a predetermined computation process and comprises a node. The sub-circuit 120 may be a small-unit circuit composing a digital circuit.

Preferably, the sub-circuit 120 may be a digital circuit logic gate(AND, OR, NOR, XOR, NOT) or a digital circuit composed of a combination of logic gates which is capable of performing an operation. The sub-circuit 120 receives the data through each input node and receives the data to correspond to a number of input nodes in series or in parallel. Here, the apparatus for computing error rate 100 may include a first circuit interface including a terminal which is connected to the sub-circuit 120. The sub-circuit 120 receives data from the input part through the first circuit interface and outputs output data of the sub-circuit 120 to the error generating part 140. The sub-circuit 120 performs the process of input or output data through the first circuit interface but the transmission process through the first circuit interface will be omitted for simplify the description of the present invention.

The test circuit 130 receives data from the input part 110, outputs output data of the test circuit which is generated by the same computation process which is the predetermined in the sub-circuit 120, and comprises a node. The test circuit 130 receives the data of which type and value are the same as the sub-circuit 120. Since the test circuit 130 generates output data from the input data and the test circuit output data is compared to the sub-circuit output data, it is appreciated to have the same output data of the sub-circuit 120 and perform the same computation process performed by the sub-circuit 120. Because the test circuit 130 should be changed when an error is injected, a part of values of the test circuit 130 is changed according to a predetermined pattern by receiving the error through the error injecting part 150. Here, the apparatus for computing an error rate 100 may include the second circuit interface including a terminal to be connected to the test circuit 130. The test circuit 130 receives data from the input part 110 through the second circuit interface, outputs output data of the test circuit 130 to the error detecting part 160, and receives an error from the error injecting part 150. The test circuit 130 performs the process of input or output data through the second circuit interface but the transmission process through the second circuit interface will be omitted for simplify the description of the present invention.

The error generating part 140 generates an error by extracting node information from the sub-circuit 120. The error generating part 140 extracts input node and output node list of the digital circuits to which an error can be injected from the sub-circuit 120. The list is formed based on netlist of the sub-circuit 120. Or the error generating part 140 receives a gate-level circuit diagram of the sub-circuit 120 and extracts all input/output nodes and all node information in the sub-circuit 120 to which it is desired to occur an error. The extracted node can be the node to which an error will be injected and the node information is included in error injection information to be generated later.

The error generating part 140 generates error injection information comprising a predetermined error generation rate, node information of the test circuit 130, and error occurrence time information to cause an error. Here, the node information of the test circuit 130 results from the node information of the sub-circuit 120. The error occurrence time information is information about a certain time to occur an error to a node according to the predetermined error generation rate. The error generating part 140 transmits the error injection information to the error injecting part 150 to let the error injecting part 150 inject an error to the test circuit 130.

The error injecting part 150 injects the error corresponding to the error injection information to the test circuit 130. Particularly, the error injecting part 150 injects the error to the node resulted from the node information of the sub-circuit 120 at the time corresponding to the error occurrence time information. The error injecting part 150 reads a node value from the test circuit 130, inverts the node value and stores the result in the test circuit 130. The test circuit 130 to which the error is injected operates in the changed form due to the error injection. The error injecting part 150 is able to inject an error, which can be varied by controlling time and node with the error injection information, to the test circuit 130.

The error detecting part 160 compares the sub-circuit output data which is the output of the sub-circuit 120 to the test circuit output data which is the output of the test circuit 130. The error detecting part 160 determines as occurrence of error and detects the error when the sub-circuit output data disagrees with the test circuit output data. The test circuit 130 generates different test circuit output data depending on injected errors.

The error rate computing part 170 computes an error rate by statistic processing of the error-determined results. Since an error probability computed by the error rate computing part 170 is a probability to cause data fails when data is inputted to the sub-circuit 120, it means an error probability for the sub-circuit input node.

Here, at least one of the error generating part 140, the error detecting part 160 and the error rate computing part 170 can be implemented in a SoC type. Or at least one of the error generating part 140, the error detecting part 160 and the error rate computing part 170 can be implemented in a software module operating through a computer comprising process, memory and the like. The apparatus for computing an error rate 100 can be implemented to include components of a computer to perform the software module corresponding to at least one of the error generating part 140, the error detecting part 160 and the error rate computing part 170.

Figure 2:
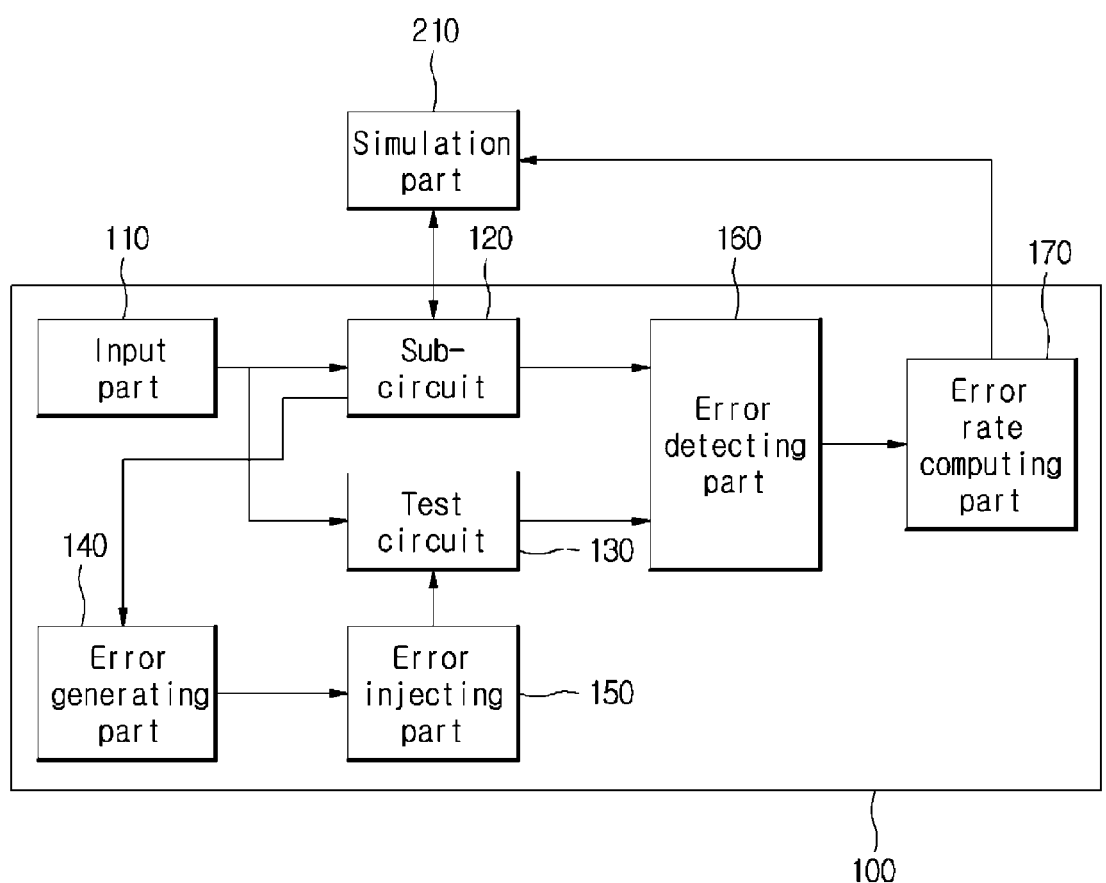
FIG. 2 illustrates a configuration view of an error simulation device according to another embodiment of the present invention.

FIG. 2 illustrates a configuration view of an error simulation device according to another embodiment of the present invention.

Referring to FIG. 2, the error simulation device 200 further comprises a simulation part 210 in addition to the input part 110, the sub-circuit 120, the test circuit 130, the error generating part 140, the error injecting part 150, the error detecting part 160 and the error rate computing part 170.

The simulation part 210 performs a static analysis for the sub-circuit 120. The static analysis is the analysis that is performed without actually executing circuits or programs when the circuits or programs are analyzed. It is usually difficult to detect logic errors in circuits or programs without executing programs but the static analysis may help to detect such errors.

The simulation part 210 computes an output node error probability of the sub-circuit 120 based on an input node error probability of the sub-circuit 120. When the sub-circuit 120 includes a plurality of input nodes, the simulation part 210 computes an output node error probability of the sub-circuit 120 based on a sub-circuit input node error probability for the plurality of input nodes. When the input node of the sub-circuit 120 is more than 1, the simulation part 210 computes a sub-circuit output node error probability by modeling a sub-circuit input node error probability of each node.

Here, the simulation part 210 can be implemented in a SoC(System-on-Chip) type. Or the simulation part 210 can be can be implemented in a software module operating through a computer comprising process, memory and the like. The error simulation device 200 can be implemented to include components of a computer to perform the software module corresponding to the simulation part 210.

Figure 3:
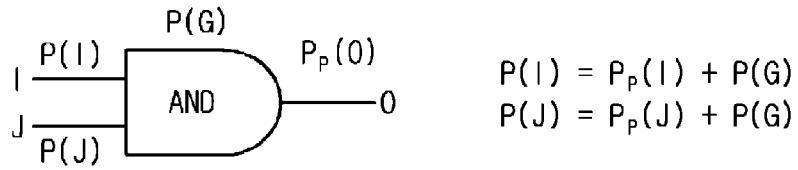
FIG. 3 is an exemplary view illustrating simulation of an error simulation device for sub-circuits according to an embodiment of the present invention.

FIG. 3 is an exemplary view illustrating simulation of an error simulation device for sub-circuits according to an embodiment of the present invention.

Referring to FIG. 3, the simulation part 210 conducts static analysis of the input node error probability of the sub-circuit 120 which includes a plurality of input nodes to compute an output node error probability of the sub-circuit 120.

In FIG. 3, the sub-circuit 120 is a AND gate which is the most basic one in digital circuits and an error probability of a desired node is an output node error probability($P_p(O)$) of the AND gate. O is an output node of the AND gate, each of I and J is an input node of the AND gate. $P_p(I)$ is an AND gate I input node error probability computed by the error rate computing part 170 when the AND gate is the sub-circuit 120, and $P_p(J)$ is an AND gate J input node error probability computed by the error rate computing part 170 when the AND gate is the sub-circuit 120.

During the static analysis, the input node error probability is the value of input node error probability computed by the error rate computing part 170 and corrected with the AND gate. Thus, an AND gate I input node correction error probability P(I) is $P_p(I)$+P(G) and an AND gate J input node correction error probability P(J) is $P_p(J)$+P(G), in which P(G) is a gate error probability. Particularly, P(I) is represented by the sum of $P_p(I)$ which is a probability of being non-zero value on output terminal due to error on input terminal I when the input terminal I is 0, and P(G) which is a probability of being non-zero value on output terminal due to error in the AND gate circuit which is the sub-circuit 120 when the input terminal I is 0. P(J) is represented by the sum of $P_p(J)$ which is a probability of being non-zero value on output terminal due to error on input terminal J when the input terminal J is 0, and P(G) which is a probability of being non-zero value on output terminal due to error in the AND gate circuit which is the sub-circuit 120 when the input terminal J is 0. P(G) is a probability of occurring error on an output node value due to occurrence of error in the AND gate circuit and is constant regardless of input node.

The simulation part 210 includes an AND gate I input node correction error probability P(I) and an AND gate J input node correction error probability P(J), and calculates an AND gate O output node error probability $P_p(O)$ by modeling using number of AND gate input/output cases. AND gate I,J input node data and number of AND gate O output node cases are as follows: (I, J, O)=(0, 0, 0) P(I)*P(J)) (I, J, O)=(0, 1, 0) P(I)*(1−P(J))) (I, J, O)=(1, 0, 0) (1−P(I)) *P(J)) (I, J, O)=(1, 1, 1) 1−(1−P(I))*(1−P(J). Therefore, the final $P_p(O)$ is represented by the following Equation (1).

$$P_p(O) = \{P(0, 0) + P(0, 1) + P(1, 0) + P(1, 1)\}/4 \quad (1)$$

-continued $$= 2 \times \{P(I) + P(J) - P(I) \times P(J)\}/4$$

$$= \{P(I) + P(J) - P(I) \times P(J)\}/2$$

The simulation part 210 includes an AND gate input node error probability for a plurality of input nodes and performs static analysis so that it is able to calculate the final output node error probability easily without RTL simulation to the AND gate.

Figure 4:
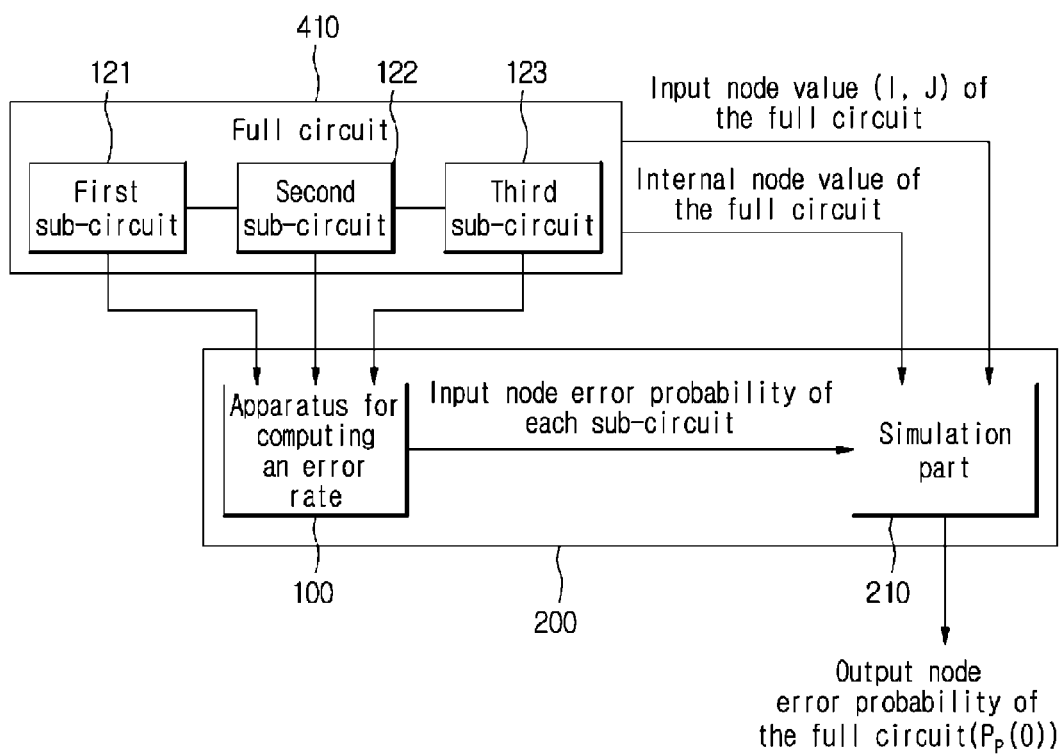
FIG. 4 illustrates a configuration view of an error simulation device for a full circuit comprising a plurality of sub-circuits according to an embodiment of the present invention.

FIG. 4 illustrates a configuration view of an error simulation device for a full circuit comprising a plurality of sub-circuits according to an embodiment of the present invention.

Referring to FIG. 4, the error simulation device 200 simulates for a plurality of sub-circuits 120 including a first sub-circuit 121, a second sub-circuit 122 and a third sub-circuit 123.

The error simulation device 200 conducts a simulation analysis for a full circuit 410 including a plurality of sub-circuits 120 unlike a simulation analysis for a single circuit. The error simulation device 200 conducts a static analysis based on input node error probabilities of nodes of the sub-circuit 120 which are the first inputs of the full circuit 410 to compute output node error probabilities of nodes of the sub-circuit 120 which are the final outputs of full circuit 410. The error simulation device 200 computes output node error probabilities of the sub-circuit 120, and further computes input node error probabilities of the sub-circuit 120 of the next step and output node error probabilities of the sub-circuit 120 of the next step based on the output node error probabilities of the sub-circuit 120.

The error simulation device 200 shown in FIG. 4 conducts a simulation for the full circuit 410 including the plurality of sub-circuits 120 of the first sub-circuit 121, the second sub-circuit 122 and the third sub-circuit 123. An output node of the second sub-circuit 122 can be connected to an output node of the first sub-circuit 121 to connect the second sub-circuit 122 and the first sub-circuit 121, and an input node of the third sub-circuit 123 can be connected to an output node of the first sub-circuit 121 or an output node of the second sub-circuit 122. Each input node error probability of the first sub-circuit 121, the second sub-circuit 122 and the third sub-circuit 123 is computed by the apparatus for computing an error rate 100.

The simulation part 210 receives information about input node error probability of each sub-circuit from the apparatus for computing an error rate 100 and performs static analysis for the full circuit 410 including the first sub-circuit 121, the second sub-circuit 122 and the third sub-circuit 123 which are connected each other.

The simulation part 210 computes output node error probability of the next sub-circuit based on input node error probability of the previous sub-circuit. For example, output node error probability of the second sub-circuit 122 can be calculated based on input node error probability of the first sub-circuit 121. Preferably, the simulation part 210 computes output node error probability of the second sub-circuit 122 by placing output node error probability of the first sub-circuit 121 as input node error probability of the second sub-circuit 122 on the basis of input node error probability of the first sub-circuit 121. The simulation part 210 performs static analysis for the full circuit 410 in a cascade method.

Figure 5:
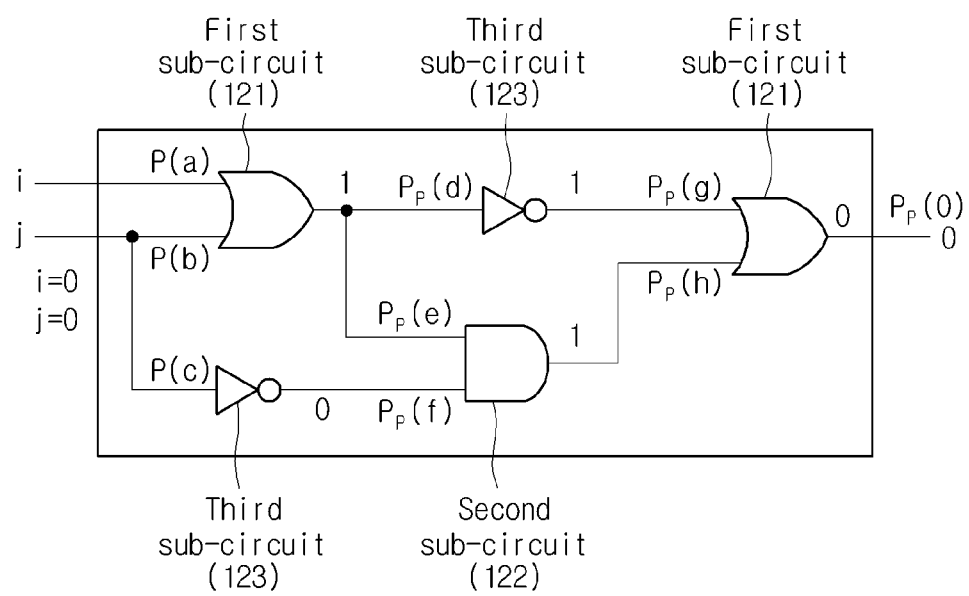
FIG. 5 is an exemplary view illustrating error simulation for a full circuit according to an embodiment of the present invention.

FIG. 5 is an exemplary view illustrating error simulation for a full circuit according to an embodiment of the present invention.

Referring to FIG. 5, a static analysis process for a digital full circuit 410 including sub-circuits 120 such as an AND gate, an OR gate, a NOT gate is illustrated. The digital full circuit 410 composed with 5 sub-circuits is processed for the static analysis. It is assumed that the first sub-circuit 121 is an OR gate, the second sub-circuit 122 is an AND gate, the third sub-circuit 123 is a NOT gate, the fourth sub-circuit 124 is a NOT gate, the fifth sub-circuit 125 is an OR gate, I, J each is an input node of the full circuit 410, input of the input node I, J (I, J)=(0,0), (I, J)=(0,1), (I, J)=(1,0) and (I, J)=(1,1), and each output node error probability of the full circuit 410 is $P_p(0,0)$, $P_p(0,1)$, $P_p(1,0)$, $P_p(1,1)$. It is appreciated that the sub-circuits 120 which is composed with the same configuration can be included in the digital full circuit 410 and the same sub-circuits 120 have the same input/output node error probability.

The simulation part 210 calculates each output node error probability $P_p(0,0)$, $P_p(0,1)$, $P_p(1,0)$, $P_p(1,1)$ of the full circuit 410 when the input node I, J of the full circuit 410 (I, J)=(0,0), (I, J)=(0,1), (I, J)=(1,0) and (I, J)=(1,1) and completes the static analysis by computing the final output node error probability $P_p(O)$ of the full circuit 410.

When the input node I, J of the full circuit 410 (I, J)=(0,0), the final output node error probability $P_p(O)$ of the full circuit 410 can be computed as follows. Error probabilities for the nodes of the full circuit 410 are $P_p(a)$, $P_p(b)$, $P_p(c)$, $P_p(d)$, $P_p(e)$, $P_p(f)$, $P_p(g)$, $P_p(h)$. $P_p(d)$, $P_p(e)$ are output node error probabilities of the OR gate which is the first sub-circuit 121, and $P_p(f)$ is output node error probability of the NOT gate which is the third sub-circuit 123. In addition, $P_p(d)$ is input node error probability of the NOT gate which is the third sub-circuit 123 and $P_p(e)$, $P_p(f)$ are input node error probabilities of the AND gate with is the second sub-circuit 122.

$P_p(g)$ is output node error probability of the NOT gate which is the third sub-circuit 123, and $P_p(h)$ is output node error probability of the AND gate which is the second sub-circuit 122. In addition, $P_p(g)$, $P_p(h)$ are input node error probabilities of the OR gate which is the first sub-circuit 121.

The simulation part 210 computes each of input node error probability of the first sub-circuit 121 ($P_p(a)$), input node error probability of the second sub-circuit 122($P_p(b)$) and input node error probability of the third sub-circuit 123($P_p(c)$). The simulation part 210 computes input node error probability of the third sub-circuit 123($P_p(d)$) and input node error probability of the second sub-circuit 122($P_p(e)$, $P_p(f)$) by using internal node I, J, D, F values of the full circuit and the input node error probability of the first sub-circuit 121($P_p(a)$) and input node error probability($P_p(c)$) of the third sub-circuit 123. The simulation part 210 computes input node error probabilities of the first sub-circuit 121($P_p(g)$, $P_p(h)$) by using internal node D, F, G, G values of the full circuit and the input node error probability of the third sub-circuit 123($P_p(d)$) and the input node error probabilities of the second sub-circuit 122 ($P_p(e)$, $P_p(f)$). The simulation part 210 computes output node error probability $P_p(O)$ of the full circuit by using internal node G,H,O values of the full circuit and the input node error probability of the first sub-circuit 121. Accordingly, the output node error probability $P_p(O)$ of the full circuit can be computed easily by only using input node error probabilities ($P_p(a)$, $P_p(b)$, $P_p(c)$) of the first sub-circuit 121, the second sub-circuit 122 and the third sub-circuit 123 without the RTL simulation.

Furthermore, the final output node error probability $P_p(0,0)$ of the full circuit 410 can be represented only by the initial input node error probabilities $P_p(a)$, $P_p(b)$, $P_p(c)$ of the full circuit 410 and the gate error probabilities $P_{or}(G)$, $P_{and}(G)$, $P_{not}(G)$ as shown in Equations (2) to (5).

$$P(a)=P_p(a)+P_{or}(G)\ P_p(d)=1-[\{1-P(a)\}\times\{1-P(b)\}]$$

$$P(b)=P_p(b)+P_{or}(G)\ P_p(e)=1-[\{1-P(a)\}\times\{1-P(b)\}]$$

$$P(c)=P_p(c)+P_{not}(G)\ P_p(f)=P(c) \quad (2)$$

$$P(d)=P_p(d)+P_{not}(G)\ P_p(g)=P(d)$$

$$P(e)=P_p(e)+P_{and}(G)\ P_p(h)=\{1-P(e)\}\times P(f)$$

$$P(f)=P_p(f)+P_{and}(G) \quad (3)$$

$$P(g)=P_p(g)+P_{or}(G)\ P_p(Y)=P(g)\times P(h)$$

$$P(h)=P_p(h)+P_{or}(G) \quad (4)$$

$$P_p(0,0)=\{P(a)+P(b)-P(a)P(b)+2\gamma\}\times\{1-P(a)-P(b)+P(a)P(b)-\gamma\}\times\{P(c)+\gamma\} \quad (5)$$

When input of the input nodes I, J of the full circuit 410 (I, J)=(0,1), (I, J)=(1,0) and (I, J)=(1,1), each output node error probability Pp(0,1), Pp(1,0), Pp(1,1) of the full circuit 410 is calculated and then the static analysis process is completed by computing the final output node error probability Pp(Y) of the full circuit 410.

The error simulation device 200 allows simulation of the digital full circuit 410 including all sub-circuits 120 without the RTL simulation.

Figure 6:
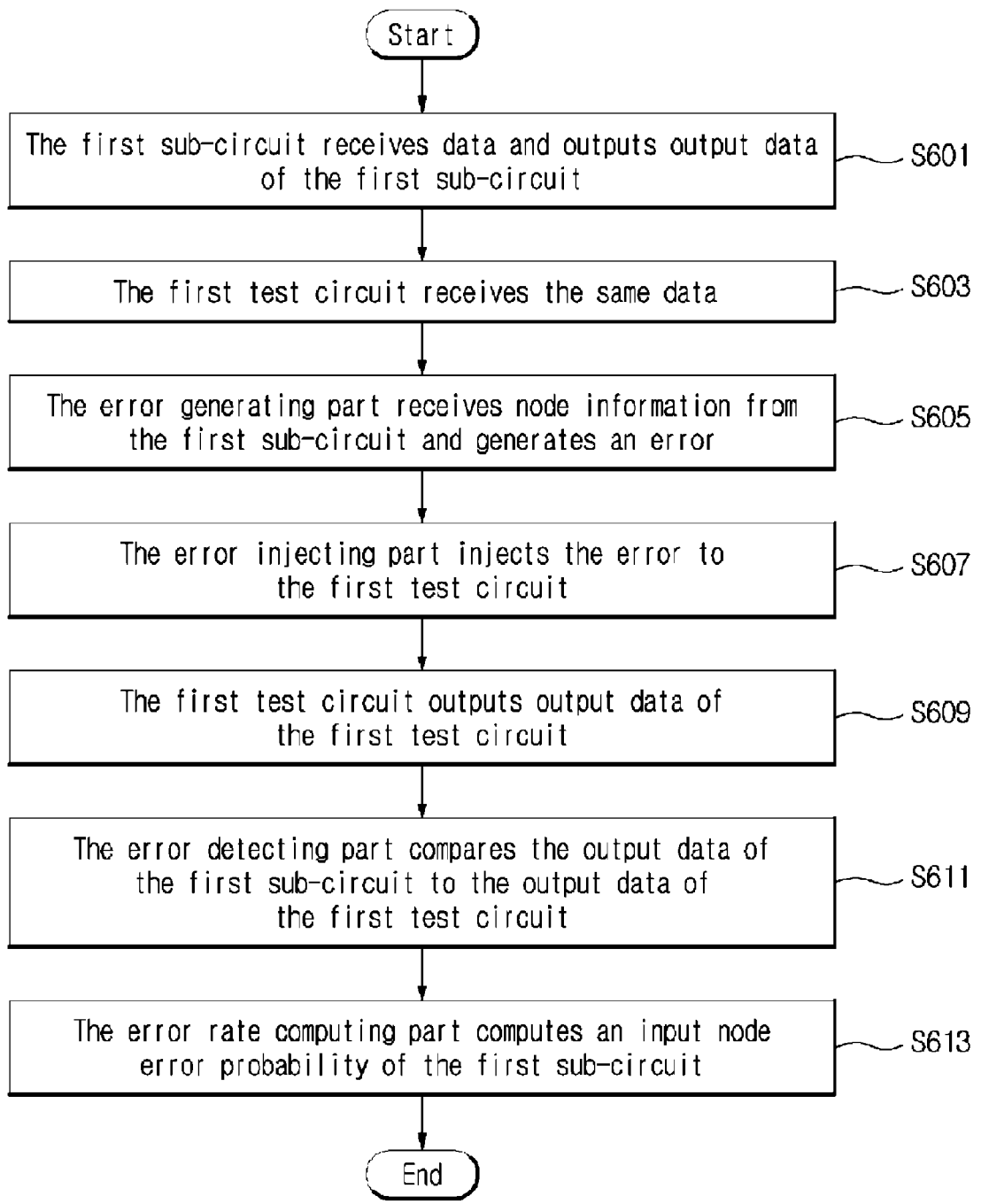
FIG. 6 is a flowchart illustrating a method for computing an error rate using an apparatus for computing an error rate according to an embodiment of the present invention.

FIG. 6 is a flowchart illustrating a method for computing an error rate using an apparatus for computing an error rate according to an embodiment of the present invention.

Referring to FIG. 6, a method of computing an error probability by an apparatus for computing an error rate is illustrated.

In S601, the first sub-circuit 121 receives data and outputs output data of the first sub-circuit 121.

In S603, the first test circuit 131 of the apparatus for computing an error rate 100 receives the same data which the first sub-circuit 121 have received.

In S605, the error generating part 140 extracts and receives node information from the first sub-circuit 121 and generates error injection information which is required to inject an error based on the node information. The error generating part 140 generates an error and transmits the generated error and the error injection information to the error injecting part 150.

In S607, the error injecting part 150 injects the error to the desired node of the first test circuit 131 to correspond to the error injection information.

In S609, the first test circuit 131 processes the inputted data and outputs output data of the first test circuit 131.

In S611, the error detecting part 160 compares the output data of the first sub-circuit 121 to the output data of the first test circuit 131 and then when the output data of the first sub-circuit 121 disagrees to the output data of the first test circuit 131, it determines as occurrence of error.

In S613, the error rate computing part 170 computes an input node error probability of the first sub-circuit 121 by statistic processing of the results.

FIG. 7 is a flowchart illustrating an error simulation method using an error simulation device according to another embodiment of the present invention.

Referring to FIG. 7, a static analysis process of the error simulation device 200 is illustrated for the digital full circuit 410 including a plurality of sub-circuits 120 of the first sub-circuit 121, the second sub-circuit 122 and the third sub-circuit 123. Input/output terminals of the first sub-circuit 121, the second sub-circuit 122 and the third sub-circuit 123 are overlapped to be connected each other.

In S701, the apparatus for computing an error rate 100 computes each of an input node error probability of the first sub-circuit 121, an input node error probability of the second sub-circuit 122 and an input node error probability of the third sub-circuit 123.

In S703, the simulation part 210 receives the computed input node error probability of each sub-circuit from the apparatus for computing an error rate 100.

In S705, the simulation part 210 receives input node value of the full circuit and each internal node value of the full circuit from the full circuit 410.

In S707, the simulation part 210 calculates error probability(input node error probability and output node error probability) of each node based on the input node error probability of each sub-circuit, the input node value of the full circuit and each internal node value of the full circuit. More particularly, the final output node error probability of the digital full circuit 410 is computed in a cascade method on the basis of input node error probability of the previous sub-circuit.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings.

DESCRIPTION OF REFERENCE NUMERALS

100: Apparatus for computing an error rate
110: Input part
120: Sub-circuit
130: Test circuit
140: Error generating part
150: Error injecting part
160: Error detecting part
200: Error simulation device
210: Simulation part

What is claimed is:

1. An apparatus for computing an error rate comprising:
    a first circuit interface being connected to a first sub-circuit receiving data and computing output data through a predetermined computation process;
    a second circuit interface being connected to a first test circuit receiving the same data, which is inputted to the first sub-circuit, and computing output data through the predetermined computation process;
    an error injecting part injecting an error to the first test circuit through the first circuit interface;
    an error detecting part comparing output data of the first sub-circuit to output data of the first test circuit and producing a compared result; and
    an error rate computing part computing an input node error probability of the first sub-circuit by statistic processing of the compared result.

2. The apparatus for computing an error rate of claim 1, further comprising an error generating part generating an error by extracting node information of the first sub-circuit.

3. The apparatus for computing an error rate of claim 2, wherein the node information comprises information of input node and output node of the first sub-circuit.

4. The apparatus for computing an error rate of claim 2, wherein the error generating part generates error injection information comprising information of error occurrence time and node of the first test circuit to cause error.

5. The apparatus for computing an error rate of claim 4, wherein the error injecting part injects an error to the first test circuit to correspond to the error injection information.

6. The apparatus for computing an error rate of claim 1, wherein the error injecting part injects an error by inverting node value of the first test circuit.

7. The apparatus for computing an error rate of claim 1, wherein the error detecting part detects an error when the output data of the first sub-circuit is compared to and disagrees with output data of the first test circuit.

8. An error simulation device comprising;
an apparatus for computing an error rate of claim 1; and
a simulation part computing an output node error probability of the first sub-circuit based on the input node error probability of the first sub-circuit.

9. The error simulation device of claim 8, wherein the first sub-circuit comprises a plurality of input nodes, the simulation part computes an output node error probability of the first sub-circuit based on an input node error probability of the first sub-circuit for the plurality of input nodes.

10. The error simulation device of claim 8,
further comprising a second sub-circuit receiving and outputting the data, comprising a node and being connected to output node of the first sub-circuit,
wherein the simulation part computes an output node error probability of the second sub-circuit based on an input node error probability of the first sub-circuit.

11. The error simulation device of claim 10, wherein the simulation part computes an output node error probability of the first sub-circuit based on an input node error probability of the first sub-circuit and computes an output node error probability of the second sub-circuit by placing the output node error probability of the first sub-circuit as an input node error probability of the second sub-circuit.

12. A method for computing an error rate comprising:
inputting data to a first sub-circuit and receiving output data from the first sub-circuit;
inputting the same data, which is inputted to the first sub-circuit, to a first test circuit;
injecting an error to the first test circuit;
receiving output data from the first test circuit;
comparing the output data of the first sub-circuit to the output data of the first test circuit and producing a compared result; and
computing an input node error probability of the first sub-circuit by statistic processing of the compared result.

13. The method of claim 12, further comprising generating an error by receiving node information of the first sub-circuit.

14. An error simulation method comprising:
inputting data to a first sub-circuit and receiving output data from the first sub-circuit;
inputting the same data, which is inputted to the first sub-circuit, to a first test circuit;
injecting an error to the first test circuit;
receiving output data from the first test circuit;
comparing the output data of the first sub-circuit to the output data of the first test circuit and producing a compared result; and
computing an input node error probability of the first sub-circuit by statistic processing of the compared result.

* * * * *